(12) United States Patent
O'Neill

(10) Patent No.: US 6,302,696 B1
(45) Date of Patent: Oct. 16, 2001

(54) BI-COLORED LINED INSTRUCTIONAL WRITING PAPER

(76) Inventor: Nancy O'Neill, 58 Sherman Ave., Bethpage, NY (US) 11714-2422

(*) Notice: Subject to any disclaimer, the term of this patent is extended or adjusted under 35 U.S.C. 154(b) by 0 days.

(21) Appl. No.: 09/470,782

(22) Filed: Dec. 23, 1999

Related U.S. Application Data

(63) Continuation of application No. 09/174,209, filed on Oct. 16, 1998, now abandoned.

(51) Int. Cl.[7] ................................................ G09B 11/00
(52) U.S. Cl. ............................ 434/162; 434/165; 283/45
(58) Field of Search .................................. 434/162, 163, 434/164, 165, 156, 115, 117, 112; 283/45

(56) References Cited

U.S. PATENT DOCUMENTS

| | | | |
|---|---|---|---|
| 3,638,332 | * | 2/1972 | Jones . |
| 3,939,588 | * | 2/1976 | Hockaday . |
| 4,035,652 | * | 7/1977 | Schroeder . |
| 4,173,082 | * | 11/1979 | Niquette . |
| 4,669,986 | * | 6/1987 | Yokoyama ........................ 434/164 |

* cited by examiner

Primary Examiner—Jacob K. Ackun, Jr.
Assistant Examiner—Bena B. Miller
(74) Attorney, Agent, or Firm—Dilworth & Barrese, LLP

(57) ABSTRACT

Instructional writing paper for instructing children to properly form letters and numerals is disclosed. The instructional writing paper preferably includes writing paper having a plurality of spaced parallel lines, the parallel lines forming at least one segment. Each segment includes a top and bottom line, wherein the top line includes indicia indicating a starting point and the bottom line includes indicia indicating a direction of letter and numeral formation. The indicia is preferably a parallel line having a highlighted color portion. The starting point is at the top line of a segment of the writing paper and the direction of letter and numeral formation is directed toward the bottom line of the segment of the writing paper. A method of teaching persons to form letters and numerals is also disclosed. The method includes the step of providing writing paper for forming letters and numerals thereon and the step of providing an audio cue associated with the indicia of the top and bottom lines of the writing paper, wherein the audio cue provides instruction for the formation of the letters and numerals from the starting point and the direction of letter and numeral formation.

3 Claims, 2 Drawing Sheets

BI-COLORED LINED INSTRUCTIONAL WRITING PAPER

This application is a continuation of U.S. Patent application Ser. No. 09/174,209, filed Oct. 16, 1998, now abandoned.

BACKGROUND

1. Technical Field

The present disclosure relates generally to the field of instructional writing paper, and more particularly, is directed to an improvement in the format of spaced lines making up instructional writing paper.

2. Background of the Related Art

The present disclosure is directed to instructional writing paper for teaching hand writing skills to children who are learning to read and write. The instructional writing paper is also particularly useful to those with special needs to assist in their learning process. Common practice in the aid of such instruction is the use of specifically formatted lined paper. The lined writing paper generally includes horizontal parallel guiding lines spaced at various increments along a writing face. The guiding lines are generally divided into two equal parts by a horizontal dotted or dashed line which is designed to guide the children in the proper formation of upper and lower case letters as well as numerals.

Various kinds of such lined writing paper have heretofore been used in the instruction of writing skills to children. Typical among such instructional writing paper is described in U.S. Pat. No. 3,638,332 to Jones. The Jones writing paper includes a series of wide colored bands separated by a series of manuscript areas. The separation between the manuscript areas and the colored bands is designed to help focus the attention of a child to write within the manuscript areas. Similarly, U.S. Pat. No. 4,173,082 to Niquette discloses instructional writing paper including separate modules containing three contiguously shaded colored bands. The Niquette patent utilizes the center colored band as a starting point for writing rather than on a separate line. As such, the ascending or descending portions of the letters are formed on upper or lower colored bands surrounding the center colored band. Likewise, in U.S. Pat. No. 4,268,256 to Moskowitz, instructional writing paper employing writing areas consisting of two colored adjacent bands is described. The writing bands are each separated by a spaced non-writing area. The Moskowitz patent discloses consecutive sheets of instructional writing paper including colored writing bands having a decreasing degree of color intensity until finally a complete fade-out of color is reached.

Heretofore, the advantages offered by instructional writing paper have primarily been based on writing paper containing broad colored bands which are used to separate writing and non-writing portions. Such devices, however, are not conducive to real world writing habits which primarily include the use of plain, non-colored, lined paper. In addition, the formation of capital letters, numerals and certain lower case letters such as: b, d, f, h, k, l and t have been difficult since there has been no reference point to indicate where to begin or end the formation of these letters and numerals.

In view of the foregoing drawbacks of previously known instructional writing paper, it would be desirable to provide instructional writing paper and associated methods of use for using the presently described writing paper which will instruct a child or mentally handicapped person to write in a proper format. Accordingly, the present disclosure overcomes the disadvantages of the prior art by providing instructional writing paper that is primarily void of wide colored bands and which utilizes plain writing paper that is formatted to closely resemble paper normally used in the real world. The present disclosure also solves the problems associated in forming capital letters, numerals and certain lower case letters by providing visual as well as verbal/audio cues which acts as a frame of reference to guide children in forming specific letters and numerals.

The embodiments herein disclosed throughout the present disclosure achieve the intended purposes, objects, and advantages through a new, useful and unobvious combination of component elements, at a reasonable cost to manufacture and by employing readily available materials.

SUMMARY

The present disclosure is directed to improved instructional writing paper for instructing primarily young children to write letters and numerals. The writing paper and method of use is designed to easily instruct children on the basic formation of letters and numerals with the minimum of instruction.

Accordingly, instructional writing paper for instructing children to write letters and numerals is disclosed. The instructional writing paper preferably includes writing paper having a plurality of spaced parallel lines, the parallel lines forming at least one segment, each segment having a top and bottom line, wherein the top line includes indicia indicating a starting point and the bottom line includes indicia indicating a direction of letter and numeral formation. The indicia are preferably parallel lines having highlighted color portions, wherein the highlighted color portions are the colors blue and/or green. The starting point is generally at the top line of a particular segment of the writing paper and the direction of letter and numeral formation is generally directed toward the bottom line of the corresponding segment of the writing paper.

Also disclosed is a system for teaching persons to form letters and numerals. The system includes a writing medium for forming letters and numerals thereon. The writing medium includes spaced parallel lines forming writing segments. Each writing segment includes top and bottom lines, wherein the top line includes indicia indicating a starting point and wherein the bottom line includes indicia indicating a direction of letter and numeral formation. The indicia are preferably parallel lines having highlighted color portions, wherein the highlighted color portions are the colors blue and/or green. The starting point is generally directed at one of the top lines of the writing medium and the direction of letter and numeral formation is generally directed toward a corresponding bottom line of the writing medium.

Preferably, the system further includes a teaching phrase for providing an audio cue to persons forming letters and numerals on the writing medium. The teaching phrase includes syntax indicating a starting point and a direction of letter and numeral formation from the starting point, wherein the syntax of the teaching phrase includes the words sky and/or grass.

A method of teaching persons to form letters and numerals is also presently disclosed. The method includes the steps of providing writing paper for forming letters and numerals thereon. The writing paper includes a plurality of spaced parallel lines which form at least one segment. Each segment includes a top and bottom line, wherein the top line includes a first indicia indicating a starting point and the bottom line includes a second indicia indicating a direction of letter and numeral formation from the starting point. The method also discloses providing an audio cue associated with the indicia of the top and bottom lines of the writing paper, wherein the audio cue provides instruction for the formation of the letters and numerals from the starting point as well as the direction of letter and numeral formation. The starting point is at a top line of a particular segment of the writing paper and the direction of letter and numeral formation is directed toward a bottom line of the corresponding segment of the writing paper.

Preferably, the step of providing writing paper includes the step of providing writing paper which includes first and second indicia as parallel lines having highlighted color portions.

The method of teaching persons to form letters and numerals also includes the step of providing an audio cue. The audio cue is a teaching phrase including specific syntax which includes the words sky and/or grass.

BRIEF DESCRIPTION OF THE DRAWINGS

The objects and features of the present disclosure, which are believed to be novel, are set forth with particularity in the appended claims. The present disclosure, both as to its organization and manner of operation, together with further objectives and advantages may best be understood by reference to the following description, taken in connection with the accompanying drawings, in which:

DETAILED DESCRIPTION OF PREFERRED EMBODIMENTS

Figure 1:
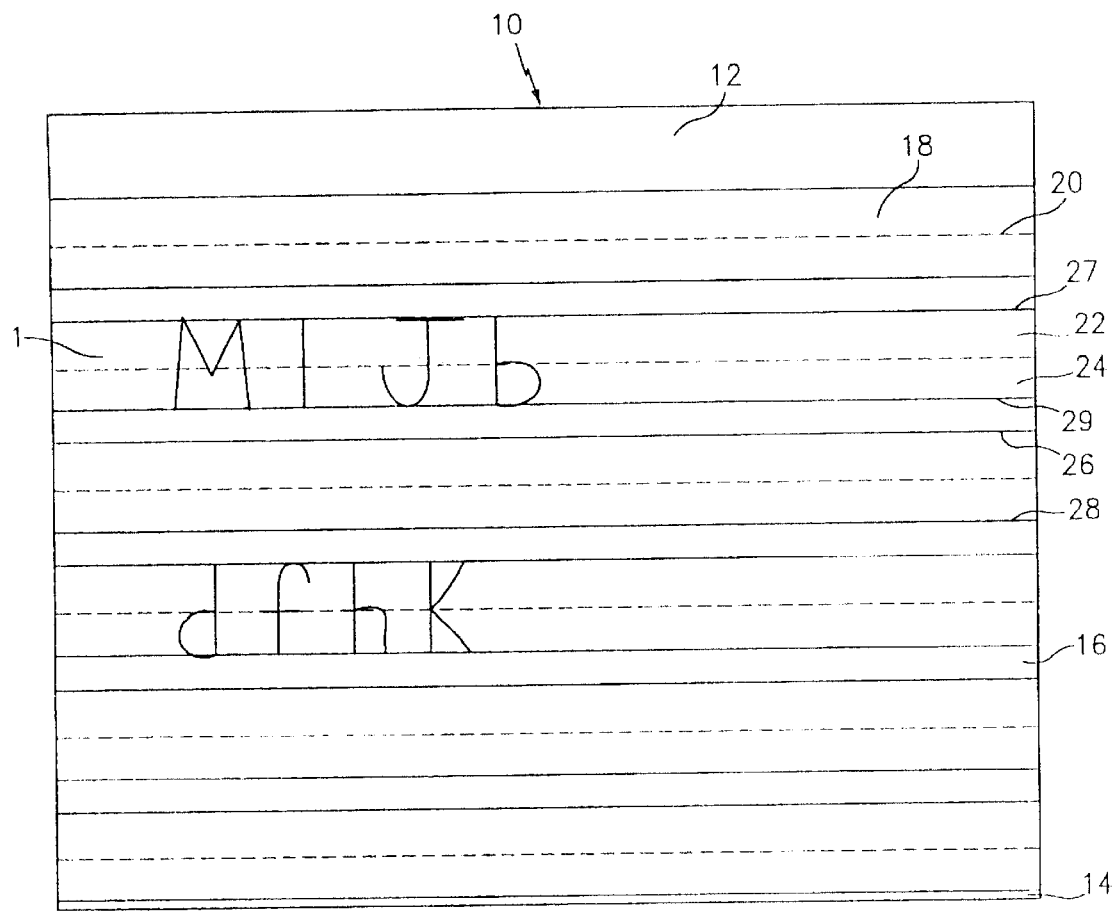
FIG. 1 is a plan view illustrating a sheet of instructional writing paper according to the present disclosure.

The preferred embodiments of the apparatus and methods disclosed herein are discussed in terms of instructional lessons and apparatus which are primarily directed to instructing children to write letters and numerals. It is envisioned, however, that the present disclosure is also applicable to situations involving the instruction of illiterate or mentally impaired persons.

In the discussion which follows, the term "letters", as is traditional, will refer to either capital or lower case alphabetical letters. The term "sheet" will refer to writing paper or other writing medium such as cardboard, laminated or plastic sheets and the like.

The following discussion includes a description of the bi-colored lined instructional writing paper followed by a description of the preferred method for using and teaching children to use the instructional writing paper in accordance with the present disclosure.

Reference will now be made in detail to the preferred embodiments of the disclosure, which are illustrated in the accompanying figures. Turning now to the figures, wherein like components are designated by like reference numerals throughout the various figures, attention is first directed to FIG. 1 which discloses a frontal plan view of instructional writing sheet 10 according to the present disclosure. Instructional writing sheet 10 is preferably sized according to standard writing paper used to instruct children of elementary age throughout the United States of America. Accordingly, instructional writing sheet 10 preferably includes a length of twelve inches and a height of nine inches. As is customary with writing paper of this type, sheet 10 includes a one inch border 12 along a top portion thereof and a ⅛ inch border 14 along a corresponding bottom portion. The front portion of sheet 10 is divided into six one inch segments 18 which are separated by five ⅜ inch separating spaces 16. Each segment 18 is further equally divided in half by a dashed or dotted line 20 which divides segment 18 into an upper portion 22 and lower portion 24 for writing letters therein. Each segment 18 further includes a top line 26 and a bottom line 28 which are in color contrast with respect to the other aforementioned lines on sheet 10. The top line 26 is preferably highlighted or colored in the color blue while the bottom line 28 is preferably highlighted or colored in the color green. The colors of the top 26 and bottom 28 lines are indicia indicating to a child a starting point and direction in which to form the letters and numerals. The indicia is dependent upon the particular teaching phrase 32 used by a teacher or child, wherein the teaching phrase 32 acts as an audio trigger to the child to form the letters and numerals in the proper direction and format. It is contemplated that the top 26 and bottom 28 lines may include other indicia, such as other color combinations, as long as such color combinations can be linked to a particular teaching phrase incorporating such indicia.

Figure 2:
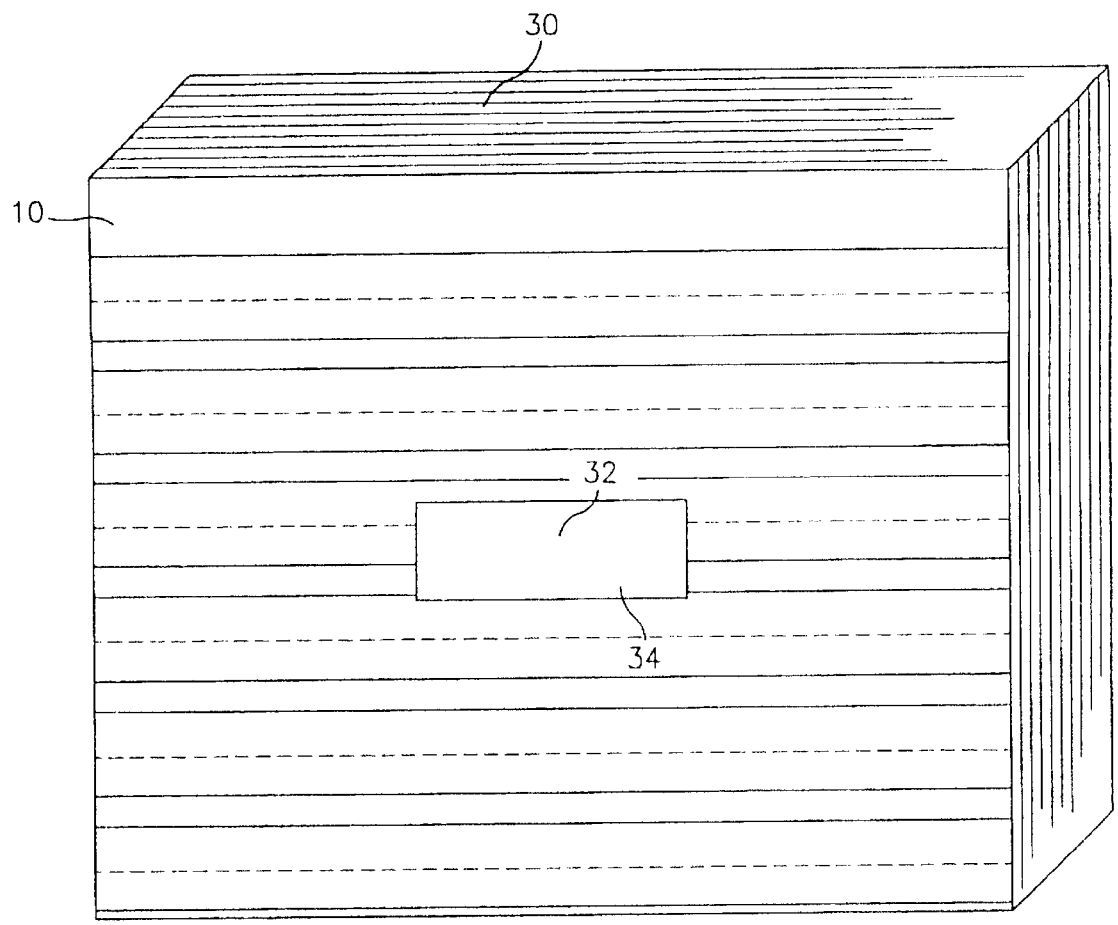
FIG. 2 is a perspective view illustrating a ream of the instructional writing paper and a sheet depicting an associated instructional phrase according to the present disclosure.

With reference to FIGS. 1 and 2, sheet 10 may be used separately or attached to a ream 30 of sheets 10. Each ream 30 may contain a plurality of sheets 10 bound along an outer edge thereof, as is known in the art. Additionally, each ream 30 of sheets 10 will include an instructional or teaching phrase 32 printed on a separate sheet or card 34. Card 34 may be formed of any size or dimension (e.g. 5 inches in height and 8 inches in length) conducive to teaching children.

The method of teaching and using the instructional writing paper 10 according to the present disclosure will now be described. In instructing children to write legibly, standard instructional writing paper is normally used. Proper formation of the letters and numerals on sheet 10 requires that the formation of capital letters, numerals and some lower case letters such as the letters b, d, f, h, k, l and t substantially begin and end at the top 26 and bottom 28 lines of each segment 18, respectively. See, for example, letters 21 at FIG. 1. Prior to the present disclosure, teaching children to write these letters has been very difficult because there has been no reference point to indicate where to begin or end the formation of these letters. The proper manner in which to form letters and numerals includes beginning the script process at the top portion of a lined space and then proceeding in a downward direction toward the bottom portion of the lined space. However, children and mentally impaired persons who are taught such proper methods inevitably, at some point, begin the process in reverse, that is, with an incorrect staring point at the bottom portion of the lined space and then proceeding in an upward direction toward the top portion of the lined space. This incorrect method of forming letters and numerals consequently causes inherent writing problems as the child begins to further develop his or her writing habits and skills. The present disclosure solves these problems by providing a visual, as well as, a verbal/audio frame of reference which guides children in the formation of letters and numerals.

The top 26 and bottom 28 lines provide a reference point for assisting children to correctly form letters and numerals of the alphabet including capital letters and lower case letters such as b, d, f, h, k, l and t. As previously discussed, each top 26 and bottom 28 line is highlighted or colored preferably in blue and green, respectively. Top 26 and bottom 28 lines provide a visual frame of reference of where to begin and end writing the letters and numerals as well direction of formation thereof. As will be discussed below, a verbal/audio reference is also disclosed which provides an audio cue to children when writing the letters and numerals. The formation of the aforementioned letters and numerals require a child to start writing at the top line 26, move in a downward direction toward bottom line 28 and then to an end point substantially near or on bottom line 28. For example, when writing the letter "b" one would start at top line 26 and move in a downward direction toward bottom line 28 (providing the vertical portion of the letter "b") and then in a circular direction at bottom line 28 (providing the arc portion. of the letter "b").

As a way to further instruct a child to write letters and numerals in the aforementioned manner, a verbal/audio teaching tool, i.e., the teaching phrase 32, is provided which assists the child in remembering the steps involved in the proper formation of the letters and numerals. The teaching phrase 32 is specifically dependent to the particular colors of the top 26 and bottom 28 lines which according to teaching phrase 32 is blue and green, respectively. The teaching phrase 32 reads as such: "Make the number reach for the sky (blue line) and then sit on the grass (green line)." Teaching phrase 32 is repeated by the child or teacher as the child writes the letters and numerals. In practice, an initial step in forming a particular letter or numeral in conjunction with teaching phrase 32 requires the child to begin writing at the top line 26 of segment 18, this corresponds to the "Make the number reach for the sky" portion of teaching phrase 32. A subsequent step requires the child to form the letter or numeral in a downward direction toward the bottom line 28 of segment 18, this corresponds to the "then sit on the grass" portion of the teaching phrase 32. Once at the bottom line 28, the remaining portion of the letter or numeral, if any, can then be formed as in the aforementioned example of the formation of the letter "b". Teaching phrase 32 is particularly designed to be used with sheet 10 of the present disclosure. The combination of the visual colored top 26 and bottom 28 lines of sheet 10 coupled with the teaching phrase 32 gives children a visual, as well as, an audio cue to assist in correctly forming letters and numerals.

It will be understood that various modifications may be made to the embodiments disclosed herein. For example, the colors of the top 26 and bottom 28 lines may be altered as long as teaching phrase 32 is also altered to correspond and depend to the colors of the top 26 and bottom 28 lines. Therefore, the above description should not be construed as limiting, but merely as exemplifications of preferred embodiments. Those skilled in the art will envision other modifications within the scope and spirit of the claims appended hereto.

What is claimed is:

1. A system for teaching persons to form letters and numerals comprising:

a writing medium for forming letters and numerals thereon, the writing medium including spaced parallel lines forming writing segments, the writing segments having a top and bottom line, wherein the top line includes indicia indicating a starting point and wherein the bottom line indicates indicia indicating a direction of letter and numeral formation and, wherein the top line indicia includes a blue highlighted color portion and the bottom line indicia includes a green highlighted color portion; and a teaching phrase for providing an audio cue to persons forming letters and numerals on the writing medium, the teaching phrase including syntax indicating the starting point and the direction of letter and numeral formation, wherein the syntax of the teaching phrase is selected from the group consisting of: sky and grass.

2. A method teaching persons to form letters and numerals comprising the steps of;

providing writing paper for forming letters and numerals thereon, the writing paper including a plurality of spaced parallel lines, the parallel lines forming at least one segment, each segment having a top and bottom line, wherein the top line includes a first indicia indicating a starting point and the bottom line includes a second indicia indicating a direction of letter and numeral formation and, wherein the top line indicia includes a blue highlighted color portion and the bottom line indicia includes a green highlighted color portion; and providing an audio cue associated with the first and second indicia of the top and bottom lines of the writing paper, wherein the audio cue provides instruction for the formation of the letters and numerals from the starting point and the direction of letter and numeral formation, wherein the step of providing an audio cue further comprises providing an audio cue including a teaching phrase, the teaching phrase including syntax selected from the group consisting of: sky and grass.

3. The method according to claim 2, wherein the step of providing writing paper further comprises providing writing including the first and second indicia being parallel lines.

* * * * *